United States Patent
Olep et al.

(10) Patent No.: US 7,866,724 B2
(45) Date of Patent: Jan. 11, 2011

(54) VISOR FOR A VEHICLE

(75) Inventors: Kirk J. Olep, Hudsonville, MI (US); Brent D. Rockafellow, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 310 days.

(21) Appl. No.: 11/661,125

(22) PCT Filed: Aug. 23, 2005

(86) PCT No.: PCT/US2005/029986

§ 371 (c)(1),
(2), (4) Date: Feb. 26, 2007

(87) PCT Pub. No.: WO2006/026269

PCT Pub. Date: Mar. 9, 2006

(65) Prior Publication Data

US 2008/0093876 A1 Apr. 24, 2008

Related U.S. Application Data

(60) Provisional application No. 60/605,712, filed on Aug. 30, 2004.

(51) Int. Cl.
*B60J 3/02* (2006.01)
(52) U.S. Cl. .................................. 296/97.11; 296/97.1
(58) Field of Classification Search ............... 296/97.1, 296/97.9, 97.11, 97.12
See application file for complete search history.

(56) References Cited

U.S. PATENT DOCUMENTS

| | | | |
|---|---|---|---|
| 4,582,356 A | 4/1986 | Kaiser et al. | |
| 4,828,313 A | 5/1989 | Lanser et al. | |
| 4,925,233 A | 5/1990 | Clark | |
| 4,998,765 A | 3/1991 | Van Order et al. | |
| 5,004,288 A | 4/1991 | Viertel et al. | |
| 5,161,850 A | 11/1992 | Redder et al. | |
| 5,409,285 A | 4/1995 | Snyder et al. | |
| 5,645,308 A | 7/1997 | Fink | |
| 5,653,490 A | 8/1997 | Fink et al. | |
| 5,765,899 A | 6/1998 | Watjer et al. | |
| 6,131,985 A | 10/2000 | Twietmeyer et al. | |
| 6,174,019 B1 | 1/2001 | Collet et al. | |
| 6,474,717 B2 | 11/2002 | Viertel et al. | |
| 6,612,637 B1 | 9/2003 | Crotty, III | |
| 6,641,197 B1 | 11/2003 | Hobson et al. | |
| 6,840,561 B2 * | 1/2005 | Mills et al. ................ | 296/97.1 |
| 7,000,972 B2 * | 2/2006 | Asai ....................... | 296/97.11 |
| 2004/0066056 A1 | 4/2004 | Mills et al. | |

FOREIGN PATENT DOCUMENTS

WO    WO 2004/030959 A2    4/2004

* cited by examiner

*Primary Examiner*—Dennis H Pedder
(74) *Attorney, Agent, or Firm*—Foley & Lardner LLP

(57) ABSTRACT

A visor for a vehicle includes a core portion configured to interface with a pivot rod to allow the visor to be moved between a storage position and a use position. A single core portion includes structure configured to receive a slideable spring assembly for mounting the visor core to the pivot rod in an extendable and retractable manner. The visor core structure is also configured to receive a fixed spring assembly to mount the visor core to the pivot rod in a non-extendable and non-retractable manner.

24 Claims, 12 Drawing Sheets

VISOR FOR A VEHICLE

CROSS REFERENCE TO RELATED APPLICATIONS

The present application is a National Phase Application of PCT/US2005/029986 titled "Visor for a Vehicle" and filed on Aug. 23, 2005, which published under PCT Article 21(2) on Mar. 9, 2006 as WO 2006/026269 A2, and which claims priority to U.S. Provisional Patent Application No. 60/605,712 titled "Visor for a Vehicle" and filed on Aug. 30, 2005, all aforementioned applications being incorporated herein by reference in their entireties.

FIELD

The present invention relates to visors for use in vehicles and more particularly to a visor having a core with structure adaptable for use as a sliding type visor and as a fixed type visor.

BACKGROUND

Visors for vehicles are generally known to provide shielding to vehicle occupants from sunlight and other light sources. The known visors are typically configured as a non-sliding (e.g. "fixed") type visor that may be capable of pivoting from a forward position (e.g. windshield, etc.) to a side position (e.g. side window, etc.). The fixed visors typically have a body portion configured to receive a pivot rod or the like that is attached to the vehicle and permits the visor body to pivot about the pivot rod (e.g. between a upward "stowed" position and a downward "usage" position). The core of the fixed-type visor is typically not configured to be extendable or retractable along a longitudinal axis of the pivot rod.

Sliding-type visors are usually configured to extend and retract along a longitudinal axis of the visor rod. The sliding visor usually has a core configured to interact with some form of slide mechanism to provide a sliding interface between the core and the visor rod. U.S. Pat. Nos. 6,474,717; 6,174,019; 5,765,899; 5,653,490; 5,645,308; 5,409,285; 5,161,850; 5,004,288; 4,998,765; 4,925,233; and 4,582,356 are representative of different approaches employed in connection with such sliding visors. Many of the structures employed in sliding visor designs require a unique detent spring and large, frequently separate sliding mechanisms which extend within channels formed in the core to achieve the desired sliding action. As a result, sliding visors tend to be somewhat bulkier and more expensive to manufacture.

The fixed visor and the sliding visor typically require cores having different structures. The core of the sliding visor is configured to accommodate a sliding mechanism, the core of the fixed visor is configured for non-extendable attachment to a visor rod.

There remains a need for a visor assembly having a single core structure that is relatively inexpensive and is adaptable for use as a fixed visor and as a sliding visor.

Accordingly, it would be desirable to provide a visor assembly having these or other advantageous features.

SUMMARY

One embodiment of the invention relates to a visor for a vehicle usable with a slide mechanism and a non-slide mechanism. The visor includes a body portion having a first core half and a second core half, and a channel formed in the body portion configured to receive the slide mechanism for a sliding visor application and configured to receive the non-slide mechanism for a non-sliding visor application. A receptacle on one of the first core half and the second core half receives a projection extending from the non-slide mechanism to substantially prevent sliding of the non-slide mechanism with respect to the body portion.

Another embodiment of the invention relates to a visor for use with a slide mechanism in a sliding visor application and a non-slide mechanism in a non-sliding visor application and includes a core portion having a channel with a size and shape configured to receive the slide mechanism to permit a slidable interaction between the core portion and a visor pivot rod, where the size and shape of the channel is also configured to receive the non-slide mechanism. Either a receptacle or a projection on the core portion engages the other of the receptacle and the projection on the non-slide mechanism, so that when the non-slide mechanism is used in the non-sliding visor application, the non-slide mechanism is substantially fixed to the core portion to prevent movement therealong.

The invention also relates to a method of making a visor for use in a sliding visor application and a non-sliding visor application. The method includes providing a first visor pivot mechanism for use in the sliding visor application and a second visor pivot mechanism for use in the non-sliding visor application and rotatably adjustable about a visor pivot rod. The method also includes providing a core portion having a channel adjacent to a top edge of the core portion, the channel having a size and shape configured to interchangeably receive the first visor pivot mechanism and the second visor pivot mechanism. The method also includes providing one of a receptacle and a projection on the core portion to engage the other of the receptacle and the projection on the second visor pivot mechanism. The method further includes installing one of the first visor pivot mechanism and the second visor pivot mechanism into the channel so that when the first visor pivot mechanism is installed the core portion is slidable relative to the visor pivot rod, and so that when the second visor pivot mechanism is installed, the receptacle engages the projection and the core portion is not slidable relative to the visor pivot rod.

DETAILED DESCRIPTION

Figure 1:
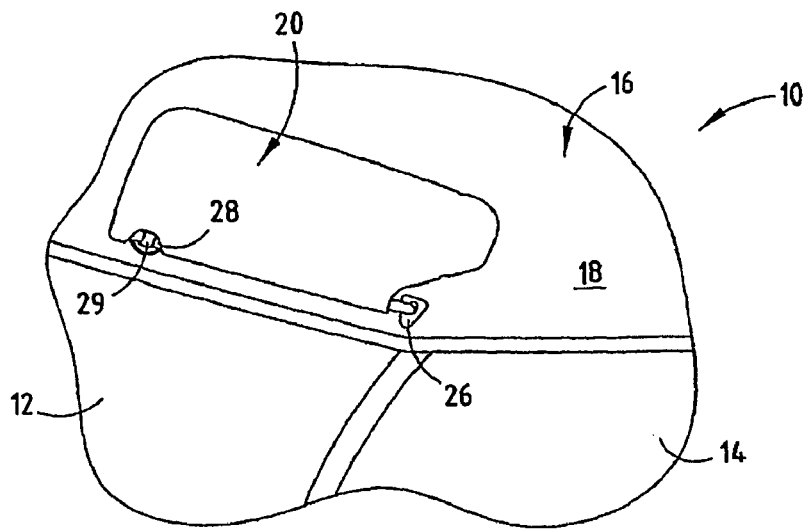
FIG. 1 is a schematic representation of a perspective view of a visor in a raised position in a vehicle according to one embodiment.
Figure 2:
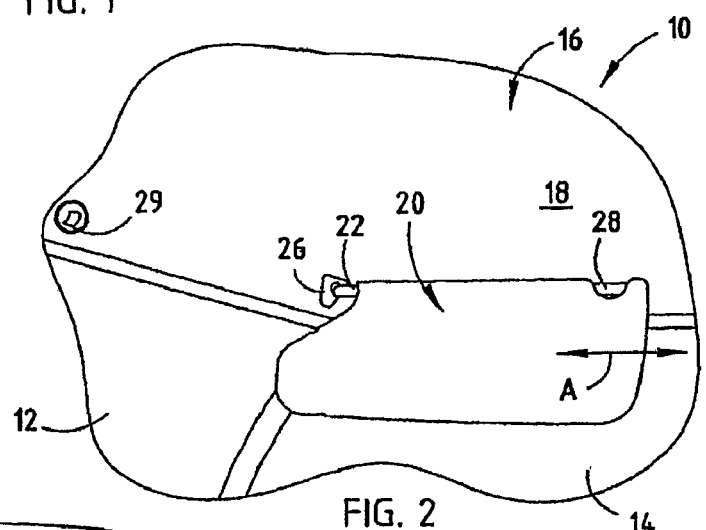
FIG. 2 is a schematic representation of a perspective view of a visor in a lowered position in a vehicle.
Figure 3:
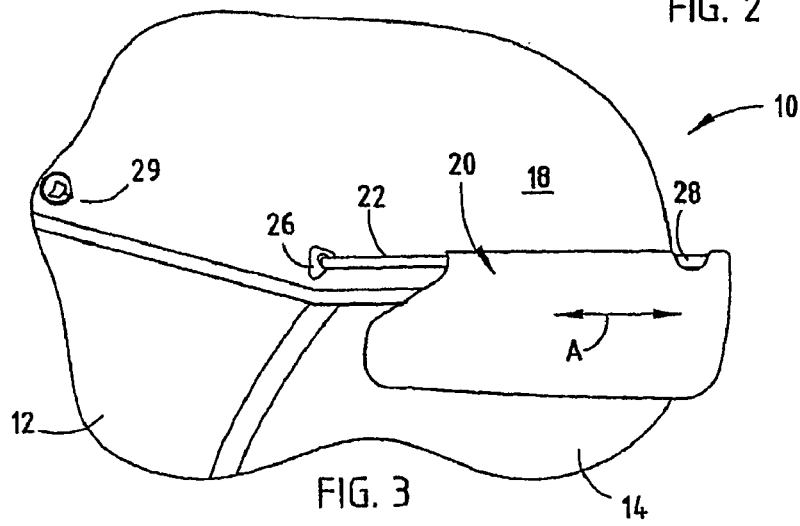
FIG. 3 is a schematic representation of a perspective view of a visor in an extended position in a vehicle.

Referring initially to FIGS. 1-3, there is shown a vehicle 10, such as an automobile, sport utility vehicle, van or the like, which has a windshield 12, a passenger right side window 14, and a structural top or roof typically covered by a headliner 16 having an upholstered surface 18 facing the interior of the vehicle. Mounted to the passenger side of the vehicle, as shown in the fragmentary perspective view of these FIGURES, is a visor 20 which is secured to the roof of the vehicle by a conventional elbow mounting bracket 26 at one end and removably attached to the front of the vehicle, as shown in FIG. 1, at the opposite end by an auxiliary clip 28 which is removably received in socket 29. This allows visor 20 to be moved from a front window position (shown in FIG. 1), lowered to a sun-blocking position adjacent windshield 12 and pivoted to a side window position (shown in FIGS. 2-3). Visor 20 may be a fixed-type visor attached to a visor pivot rod 22 in a pivotal but non-extendable manner (as shown in FIG. 1) or visor 20 may be a sliding-type visor configured to slide along a visor pivot rod 22, as illustrated by arrow A in FIGS. 2 and 3. The visor rod 22 can be a hollow steel tube or any other hollow or solid member formed from a material having suitable strength and having an end extending within and secured to the conventional mounting bracket 26 to allow the pivoting of the visor from a front windshield position to the side window position. Although a passenger side visor installation 20 is shown in FIGS. 1-3, it is to be understood that a similar visor can be mounted to the driver's side of the vehicle.

Figure 4:
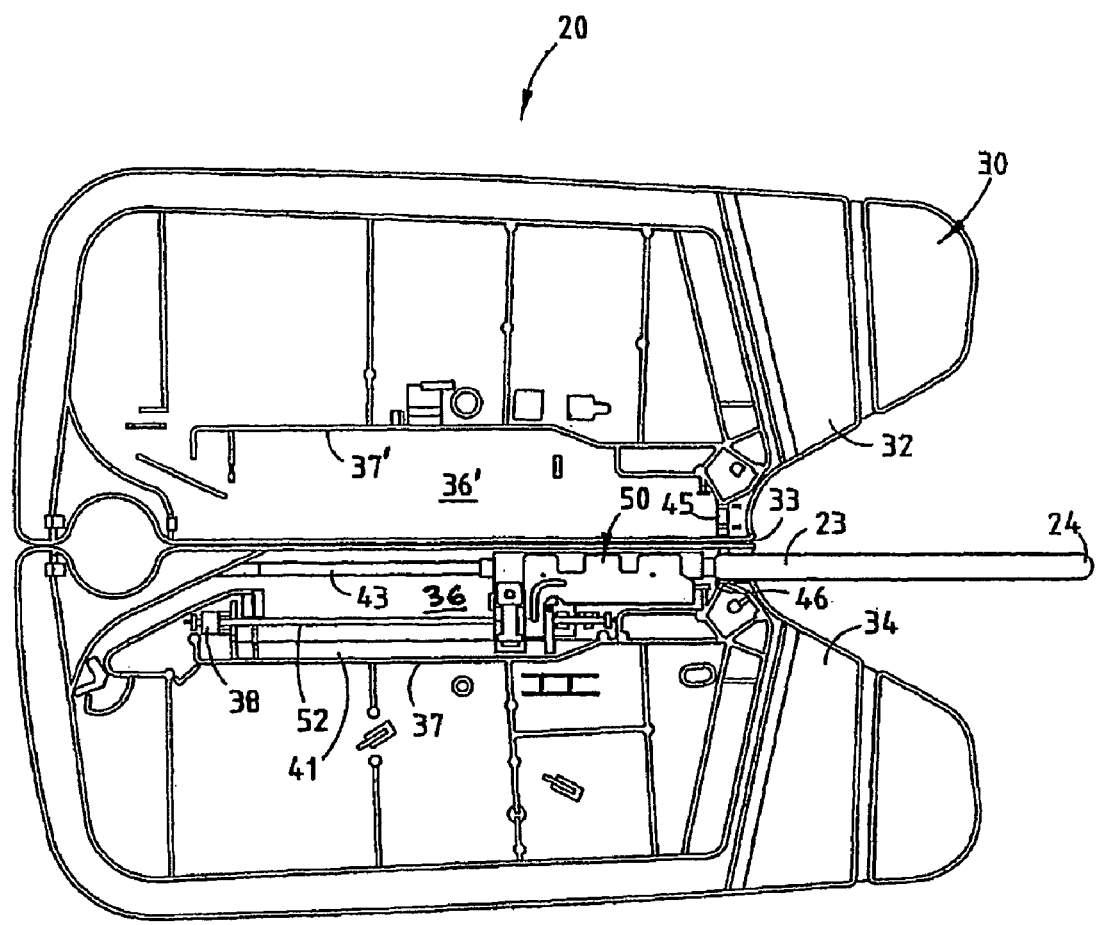
FIG. 4 is a schematic representation of a plan view of a visor core in an open position according to one embodiment.

The visor 20 includes a visor core 30, as best seen in FIG. 4, which can be a butterfly-type core having a first core half 32 and a second core half 34 joined at a hinge 33. The core can be molded of a polymeric material, such as polypropylene, although it can also be fiberboard or made of other suitable materials. The core 30 is typically covered by an upholstery on the exterior surface with the core being folded over and joined together by snap-locking tabs, ultra sonic welding, or other conventional bonding methods to complete the visor. According to an alternative embodiment, the first core half and the second core half can be "separate" pieces that are joined together in any suitable manner to form the core.

Referring to FIGS. 4-14, the visor core 30 is shown and described according to an embodiment for use with a slide assembly for adapting the visor core for use as a sliding-type visor, as described more particularly in International Patent Application No. PCT/US03/31130, the disclosure of which is incorporated by reference herein. The illustrated slide assembly is shown for exemplary purposes as an assembly that slidably interfaces with the core, however, other slide assembly configurations may be used such as a hollow member positioned within a channel in the core and configured to receive a slide assembly and pivot rod, in a reciprocal sliding manner.

Figure 6:
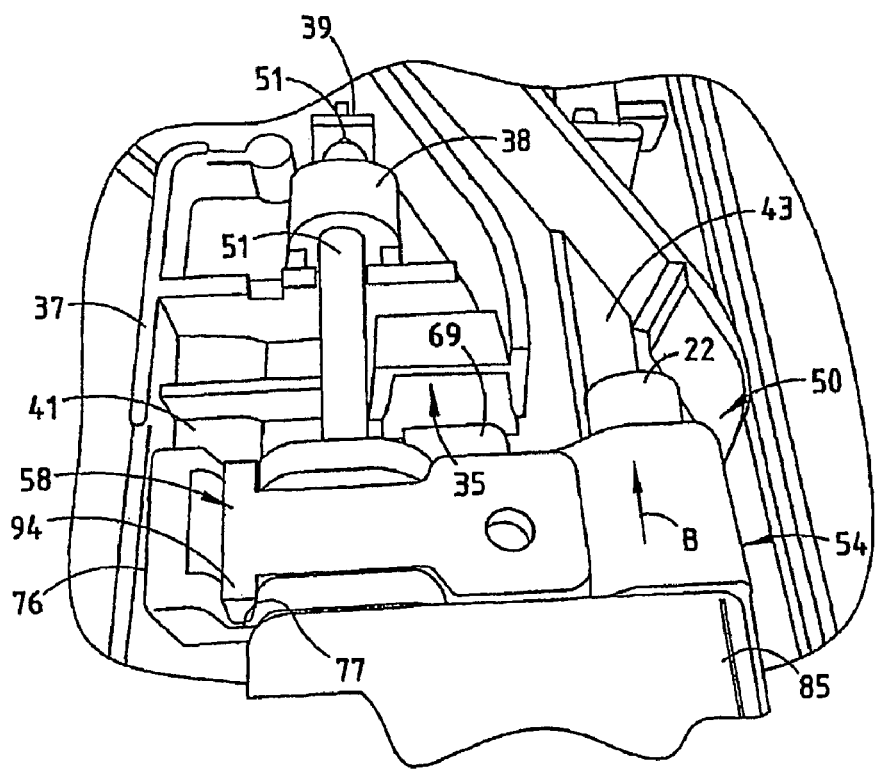
FIG. 6 is a schematic representation of an enlarged fragmentary perspective view of the visor of FIG. 4 for a sliding visor approaching a retracted position.
Figure 7:
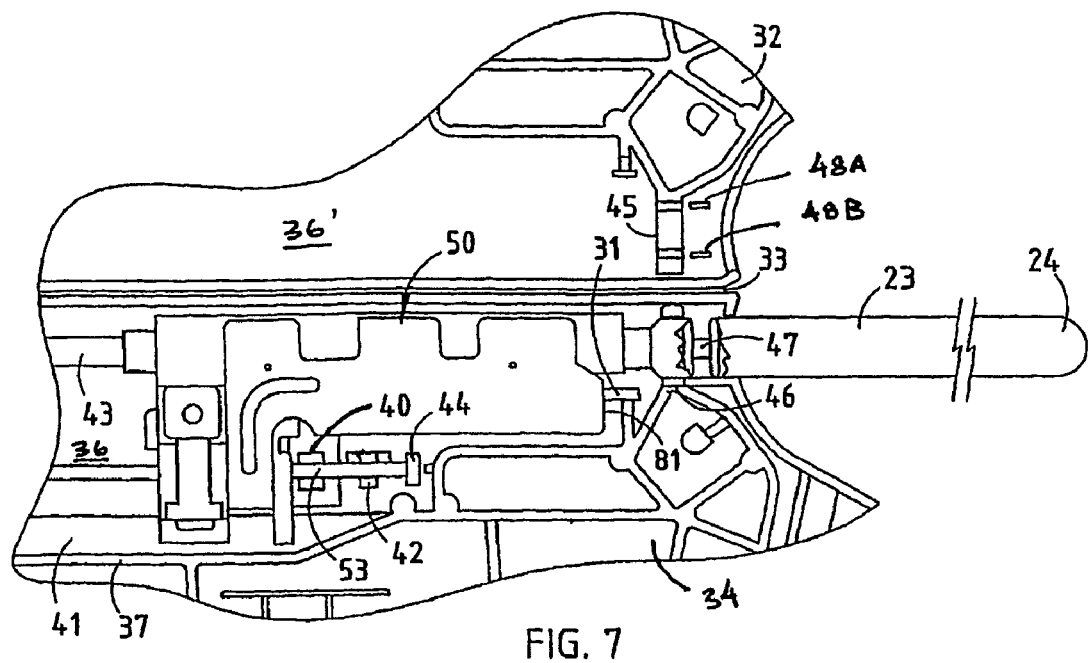
FIG. 7 is a schematic representation of an enlarged fragmentary plan view of the visor of FIG. 4 for a sliding visor in an extended position.

The core 30 is shown to slidably receive the visor rod 22 (FIGS. 2, 3, 6, 9 and 10) and slide assembly 50 (FIG. 5) within a channel 36 formed in a core half 34 by a wall 37 (FIG. 4) and a mating channel 36' and wall 37' in a core half 32 for slidably receiving slide assembly 50. The slide assembly, as best seen in FIG. 10, includes a carrier 54, a slide rod friction control 58, a compression spring 59, and a detent spring (e.g. torque clip, etc.) 56 assembled onto slide rod 52 as described below. As shown in FIGS. 4 and 7, visor core halves 32 and 34 each include semi-cylindrical cradles 45 and 46, respectively, surrounding an end 23 of visor pivot rod 22 having an overmold formed from a polymeric material (or integrally formed with the core) to guidably support the edge of the visor as it is adjustably positioned along the visor rod.

Fixedly mounted to visor core 30 is a slide rod 52, which has one end 51 captively held within an integrally formed socket 38 (FIGS. 4-6) and abuts against stop 39. The opposite end 53 of rod 52 extends into a cradle 40 (FIGS. 7-8) and an opposite end 53 which snap fits within open socket 42 adjacent cradle 40 and abuts end stop 44. Thus, slide rod 52 is fixedly mounted within the visor core half 34 in parallel spaced relationship to wall 37 and within channel 36, which is defined, in part, by a mating channel 36' and wall 37' in core half 32 when the visor core halves 32 and 34 are closed upon completion of assembly of the sliding-type visor. Channel 36, 36' is shown as a longitudinally extending channel defined by core halves 32, 34 spaced-apart when the visor is assembled sufficiently so that slide assembly 50 can slide within the channel 36, 36' with carrier 54 engaging a raised guide rail 41 (FIGS. 4-7) extending adjacent wall 37 from the floor of channel 36. A second guide rail 43 (FIGS. 4-7) extends upwardly from the floor of channel 36 (i.e., inwardly from the core half 34) and is axially aligned with visor rod 22. Rails 41 and 43 engage the carrier 54 at the top of channel 36 (near hinge 33) and adjacent wall 37 to provide a degree of friction control for the sliding movement of the visor. According to the illustrated embodiment, several other components are configured to provide frictional control for sliding movement of the visor, such as friction control 58 (to be further described) that provides a spring biased frictional interface. By further way of example, a visor rod engaging tab 47 and upstanding ribs 48A and 48B are configured to provide a frictional interface with end 24 of visor pivot rod 22 (FIG. 7), in order to provide a controlled sliding movement of the visor.

Figure 5:
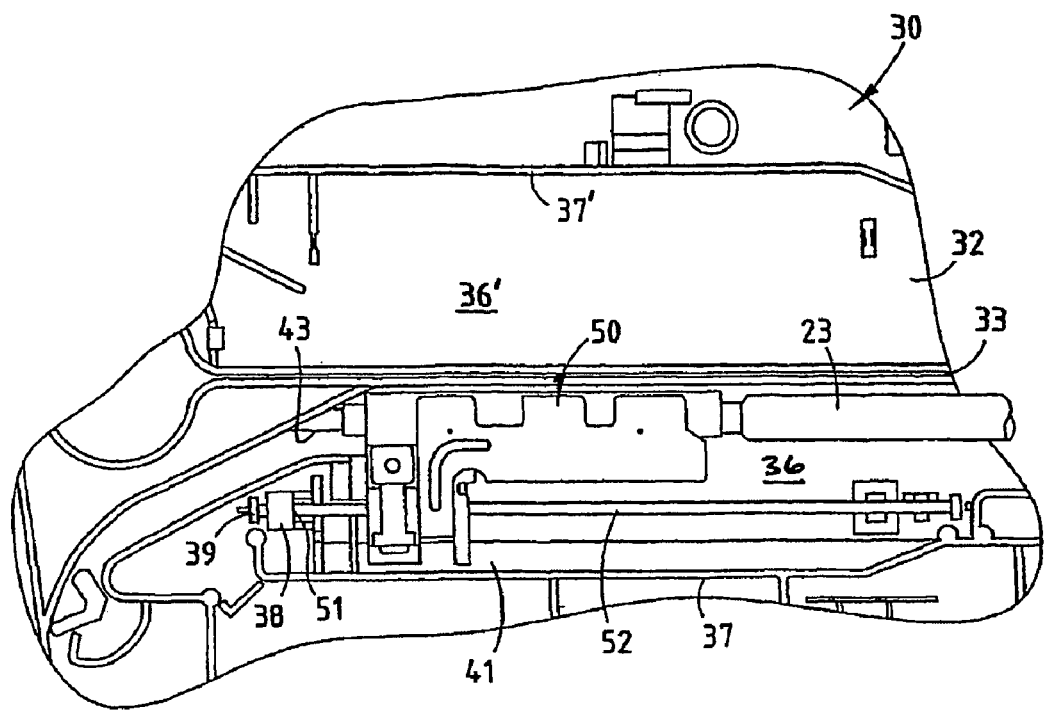
FIG. 5 is a schematic representation of an enlarged fragmentary plan view of the visor shown in FIG. 4 for a sliding visor in a retracted position.
Figure 9:
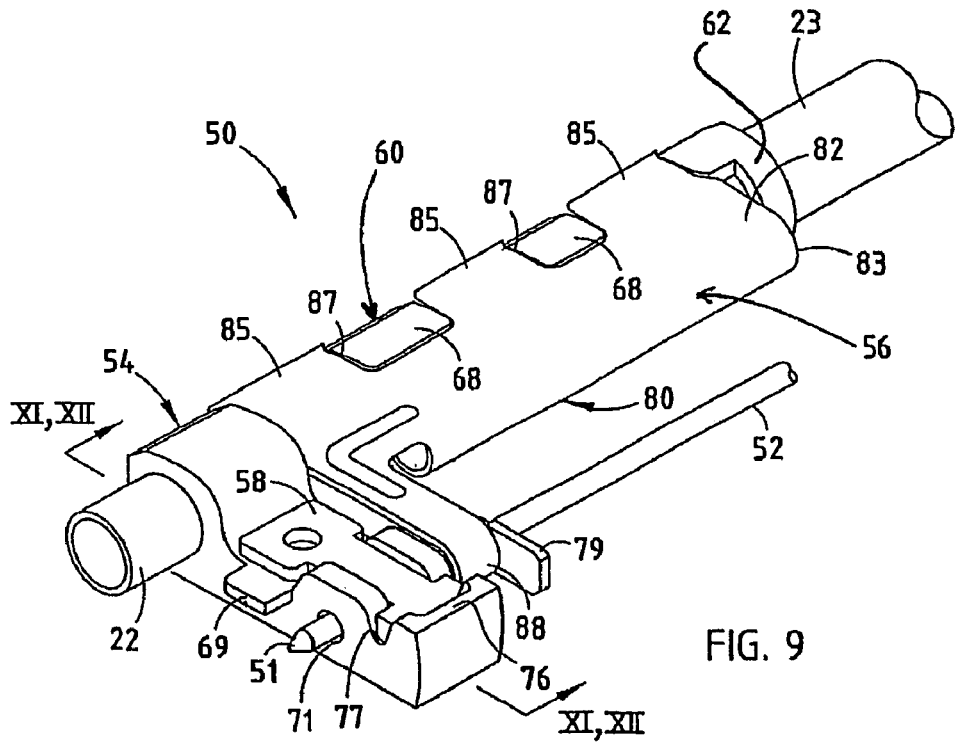
FIG. 9 is a schematic representation of an enlarged fragmentary perspective view of a slide assembly for a sliding visor according to one embodiment.
Figure 10:
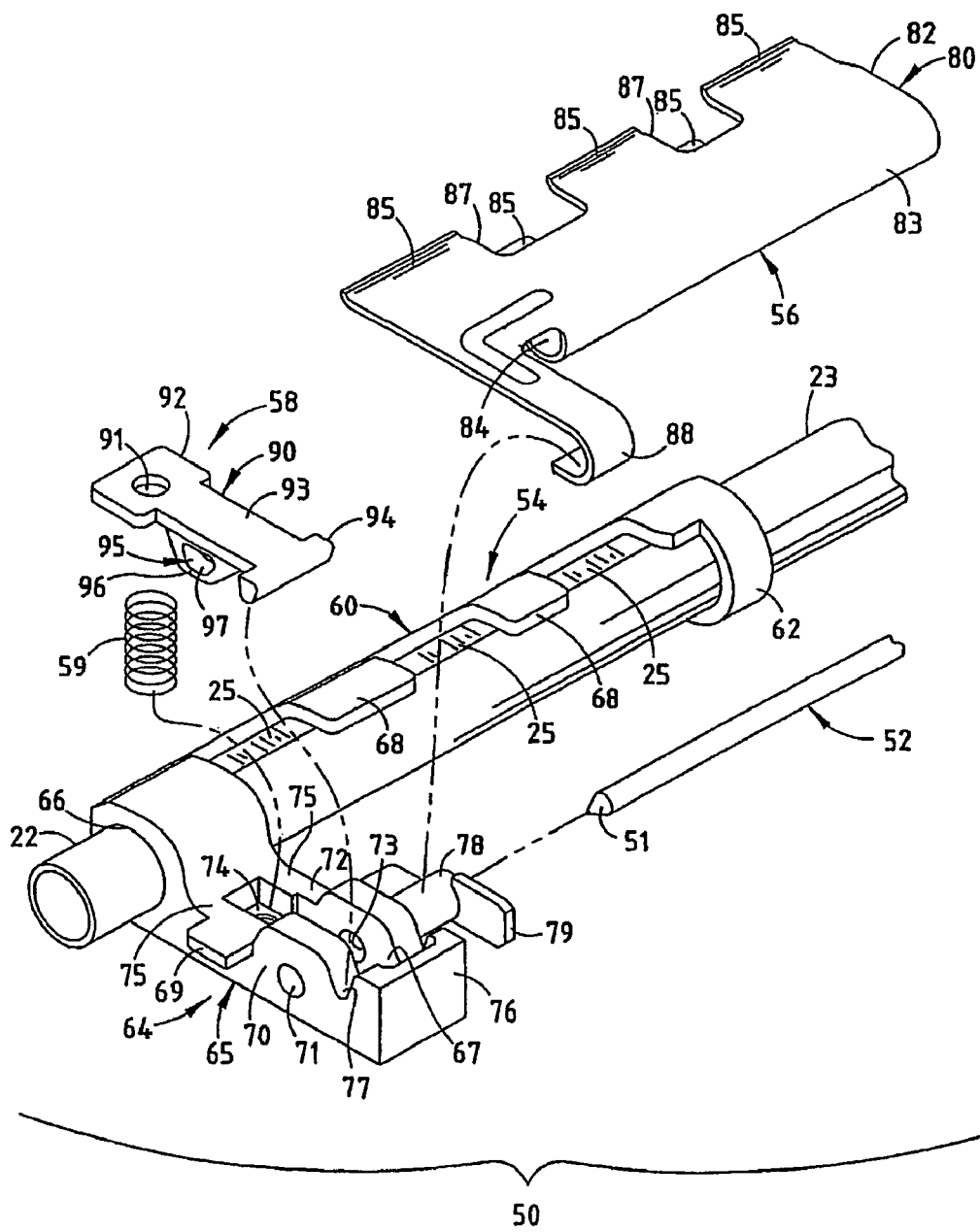
FIG. 10 is a schematic representation of an enlarged exploded perspective view of the slide assembly for a sliding visor of FIG. 9.
Figure 13:
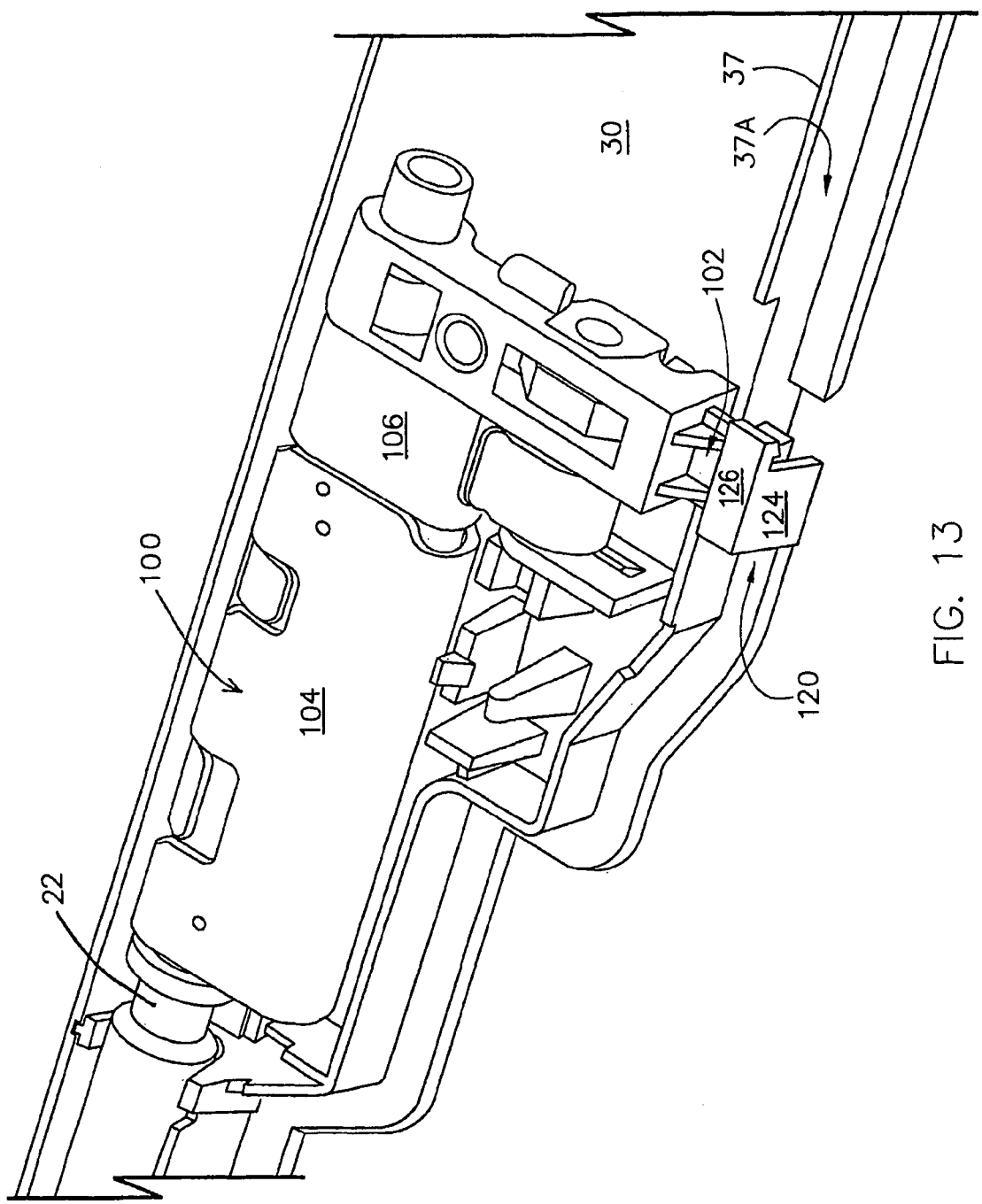
FIG. 13 is a schematic representation of a fragmentary perspective view of the visor of FIG. 4 for a fixed visor assembly according to one embodiment.

The slide assembly 50 comprises, as best seen in FIGS. 9 and 10, the integrally molded carrier 54 and a detent spring 56, which are axially fixed on visor rod 22 and move along slide rod 52, as illustrated in FIGS. 4 and 5, between a left endmost position when the visor is retracted (FIGS. 1 and 2) to a right endmost position when the visor is extended, as seen in FIGS. 3 and 7. The carrier is attached to the visor rod 22 by the surrounding detent spring 56 which engages flats 25 on the visor rod for axially fixing the slide assembly 50 so-formed to the visor rod 22. The carrier 54 and friction control 58, together with the guide rails 41 and 43, tab 47, and upstanding ribs 48A and 48B allow the controlled sliding movement of the visor core and fixed slide rod 52 with respect to the visor rod 22 by controlling the movement of slide 50 and visor rod 22 within channel 36. Carrier 54 includes a laterally extending tang 69 (FIGS. 6, 9, and 10) for docking the carrier in the visor retracted position as described below. The relatively compact slide assembly 50 for use with visor core 30 to provide a sliding type visor is now described in greater detail, particularly with reference to FIGS. 9 and 10.

The carrier 54 is shown to include an integrally molded polymeric body 60 having a collar 62 at its right end (as shown in FIGS. 9 and 10) which receives visor pivot rod 22 therein. The opposite end of body 60 includes a downwardly depending tang 64 with an aperture 66 coaxially aligned with collar 62 for supporting the end of visor pivot rod 22. Tang 64 includes a leg 65 with a recess 67 for receiving friction control 58 and compression spring 59. Leg 65 includes a pair of spaced-apart walls 70 and 72, a floor 74, and an end wall 76 defining the recess for receiving friction control 58. Walls 70 and 72 include a pair of apertures 71 and 73 in axially aligned relationship. Aperture 73 extends through laterally extending cylindrical mounting boss 78 integrally formed with leg 72. Boss 78 has an outer flange 79 thereon for captively holding the hook 88 of the detent spring 56. Leg 65 also includes a pair of shoulders 75 for supporting, as described below, the tab 92 of friction control 58 thereon. Leg 65 also includes a semicylindrical socket 77 for receiving the pivot axle 94 of friction control 58.

The detent spring 56 extends over pivot rod 22 and carrier 54 and includes a generally U-shaped body 80 with legs 82 and 84 integrally joined at curved end 83. Each of the legs include spaced-apart tangs 85, which are alternately staggered with respect to the other leg and engage alternately staggered flats 25 on pivot rod 22 (FIG. 10). Spring 56 can generally be of the type disclosed in U.S. Pat. No. 4,828,313 and is made of spring steel suitably treated for the automotive environment. The spring, however, has a hook 88 at an end which fits over boss 78 and is captively held between wall 72 and flange 79 of carrier 54, as illustrated in FIG. 9. The mounting of the detent spring on carrier 54 axially locks the slide assembly 50 to pivot rod 22 upon assembly. According to one embodiment, the carrier 54 is integrally molded of a suitable polymeric material, such as acetal, and includes pairs of spaced grease guards 68, which extend within slots 87 between tangs 85 of the detent spring 56 to retain any lubrication which may be employed between detent spring 56 and the metal pivot rod 22 and is intended to prevent or greatly reduce seepage of lubrication from the detent spring and pivot rod into the visor interior. According to alternative embodiments, other devices may be used to prevent grease seepage, such as, for example, O-rings, foam blocks or rings, wipers, etc.; or grease guards may be omitted.

Figure 11:
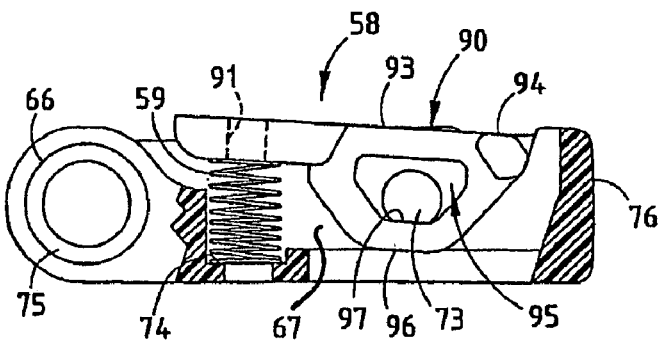
FIG. 11 is a schematic representation of a cross sectional view of the slide assembly for a sliding visor of FIG. 9 along lines XI-XI prior to assembly.
Figure 12:
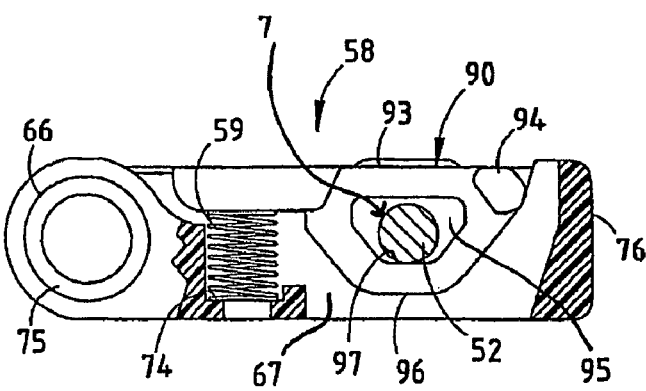
FIG. 12 is a schematic representation of a cross sectional view of the slide assembly for a sliding visor of FIG. 9, along lines XII-XII after assembly.

Friction control 58 includes a body 90, also integrally molded of a suitable polymeric material such as acetal, and includes a tab 92 at one end with a centering cylindrical projection 91 fitting within one end of coil spring 59. Tab 92 is held above shoulders 75 of carrier walls 70 and 72 by spring 59. Body 90 of control 58 includes an upper leg 93 extending from tab 92 to a pivot axle 94 at the opposite end, which axle rests within semicylindrical socket 77 formed in carrier walls 70 and 72 adjacent end wall 76. A second leg 96 extends from tab 92 to axle 94 in spaced relationship to leg 93 to define an aperture 95 through which slide rod 52 extends (FIGS. 9, 11, and 12). Leg 96 has an interior surface 97 which engages rod 52 with a constant pressure applied by the force of spring 59 urging control 58 in a clockwise direction (as viewed in FIGS. 11 and 12) about axle 94 to maintain a constant sliding friction for visor slide assembly 50 with respect to rod 52. The spring constant "k" of spring 59 is selected to provide, depending on the visor size, the desired sliding effect. In one exemplary embodiment, spring 59 had a spring constant of about 2.195 N/mm to provide a sliding effort of about 13.5 N, however, any suitable spring force to provide a desired amount of sliding effort may be used. The sliding effort is also achieved by guides 41 and 43 on core half 34, which extend in parallel relationship to slide rod 52 and underlie and engage leg 65. Tab 47, upstanding ribs 48A and 48B, and cradles 45, 46 are also configured to slidably engage surface 23 of visor pivot rod 22 and contribute to the sliding effort of visor 20 as well as reducing BSR (buzz, squeak, and rattle) of the visor.

As seen in FIGS. 10-12 during assembly, the friction control 58 and coil spring 59 are pressed into recess 67 of carrier 54, while rod 52 is inserted through apertures 73, 95 and 71 to captively hold the otherwise floating friction control 58 to carrier 54. This assembly typically takes place after the detent spring and carrier have been mounted to pivot rod 22. This subassembly, as seen in FIG. 9, is then inserted into the visor core by tipping end 51 of slide rod 52 and inserting it into socket 38 and snap-fitting the opposite end 53 of rod 52 in collar 40 and snap-fit socket 42. The rod 52 is then held in fixed relationship with respect to visor core 30 between end stops 39 and 44.

To improve the stability of the visor slide mechanism as the visor is pivoted between a lowered use position and a raised stored position, the slide assembly and core include a docking feature at each end to positively lock the slide assembly 50 to the visor core. As seen in FIG. 6 on the left end of channel 36, there is provided a socket 35 which receives the laterally extending docking tab 69 of carrier 54 therein, such that, when the visor is fully retracted as shown in FIG. 5, slide assembly 50 is positively locked to the visor core against rotation due to the close interference fit between the docking tab 69 and mating socket 35. This feature reduces the forces otherwise placed upon the side walls of channel 36 of the visor core during the normal raising and lowering motion of the visor when in a front windshield position.

Figure 8:
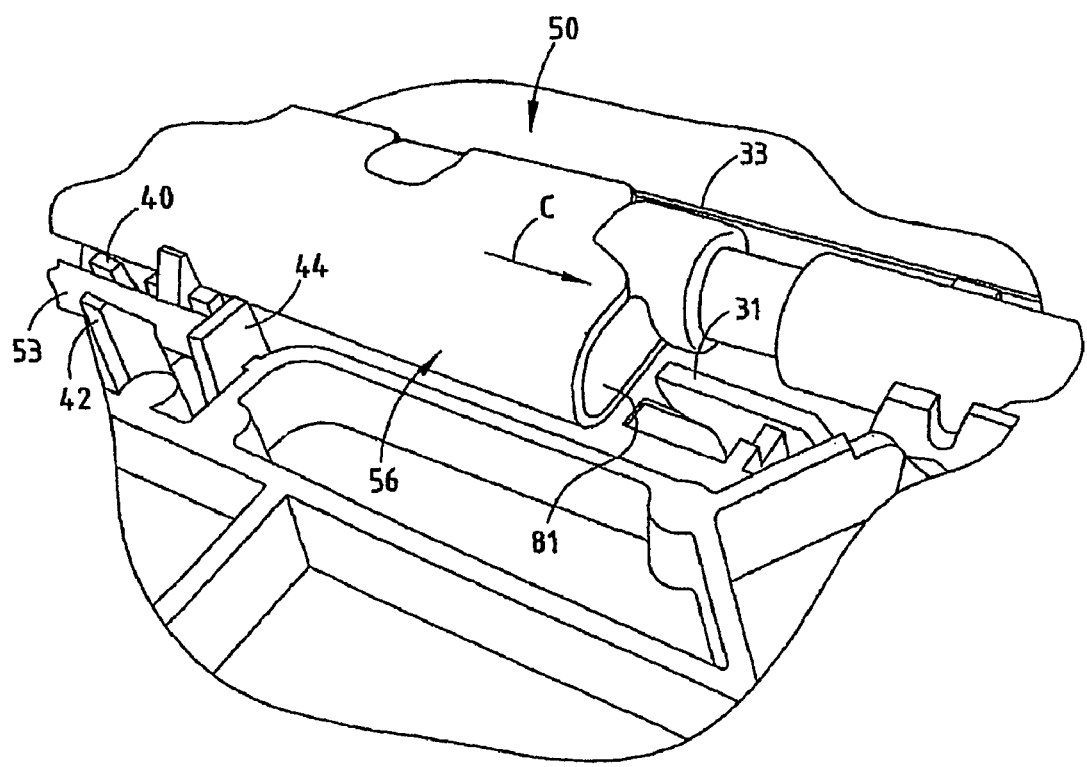
FIG. 8 is a schematic representation of an enlarged fragmentary perspective view of the visor of FIG. 4 for a sliding visor approaching an extended position.

When fully extended, the slide assembly 50 is also locked to the visor core by a tapered hook 31 (FIG. 8) which extends within an opening 81 of detent spring 56 when the slide assembly 50 is moved in the direction indicated by arrow C in FIG. 8 to a fully extended position, as seen in FIG. 7. This docking feature also provides rigidity to the interface between the visor pivot rod 22 and visor core 30 for pivoting of the visor from a lowered position to raised position if fully extended, as seen in FIG. 3.

By the use of a fixed slide rod 52, typically made of steel or other thermally stable material, and the use of a spring-loaded friction control 58 and carrier 54 which accommodate detent spring 56, a compact relatively thin profile slide assembly is provided which is coupled at one end to the slide rod, thereby greatly reducing the overall bulk of the slide assembly permitting a relatively small profile visor to accommodate the sliding motion desired for improved sun-blocking protection. The use of the spring-loaded friction control 58, which provides a major portion of the sliding effort, is intended to allow the selected sliding friction to remain relatively constant.

According to an alternative embodiment, the visor slide mechanism may include a tube (e.g. extrusion, etc.) configured to fit within a channel in a fixed relationship with the visor (such as channel 36 in the previously described embodiment) and a slide assembly (which may include a carrier rotatably connected to a pivot rod and having a detent spring for positioning the visor body) may be arranged to reciprocally slide within the tube to provide a sliding interaction between the visor and the visor pivot rod. Accordingly, all such variations are intended to be included within the scope of the disclosure.

Referring to FIGS. 13-16, the visor core 30 is also shown and described for use with a fixed carrier and spring assembly 100 according to an embodiment for use as a visor assembly that is axially fixed along the pivot rod. Fixed carrier and spring assembly 100 is configured to fit within the same space "package" of the visor core as the slide mechanism shown in FIGS. 5-12, and engages the pivot rod in a manner such that the visor core is "fixed" axially along the length of the pivot rod. The fixed carrier and spring assembly 100 operates in a similar manner as slide assembly 50 to permit rotation of the visor body about the pivot rod between a use position and a storage position as shown in FIGS. 1 and 2. However, the fixed assembly 100 is axially fixed along the length of the pivot rod to prevent axial movement of the visor with respect to the pivot rod. The ability to substitute either a slide assembly or a fixed assembly into the same visor core structure is intended to reduce the time and cost associated with manufacturing two separate visor cores to accommodate a fixed type visor and a sliding type visor.

Figure 14:
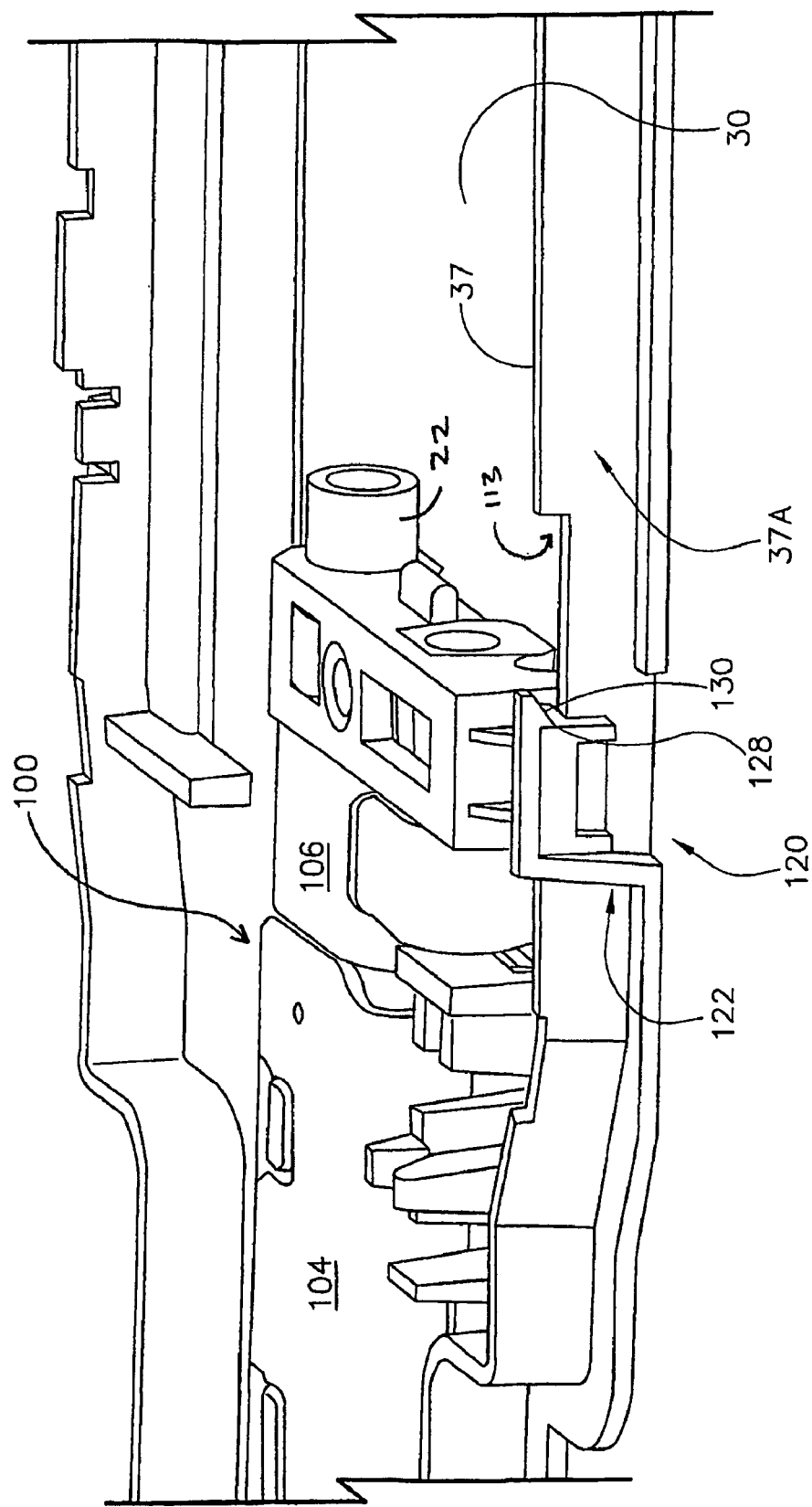
FIG. 14 is a schematic representation of a fragmentary perspective view of the visor of FIG. 13.
Figure 15:
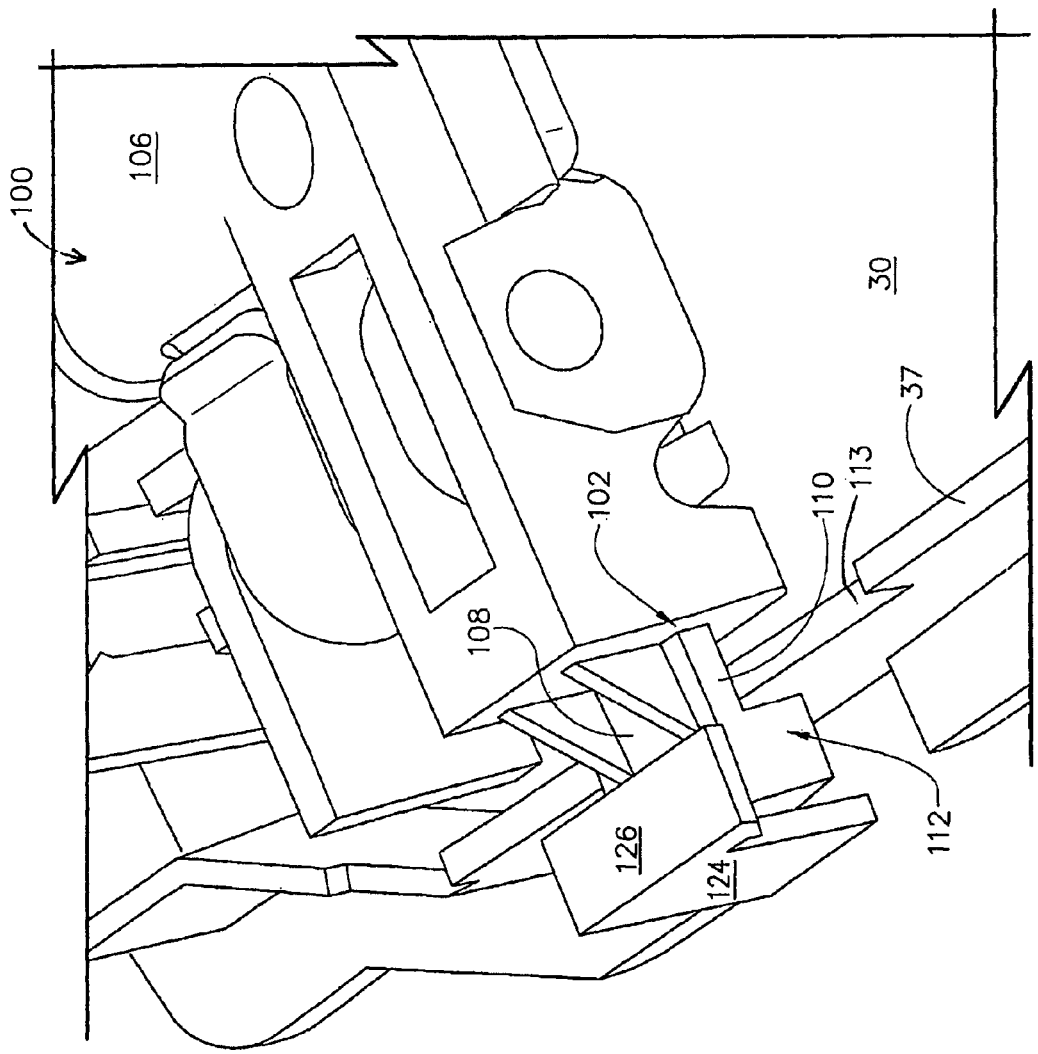
FIG. 15 is a schematic representation of a fragmentary perspective view of the visor of FIG. 13.
Figure 16:
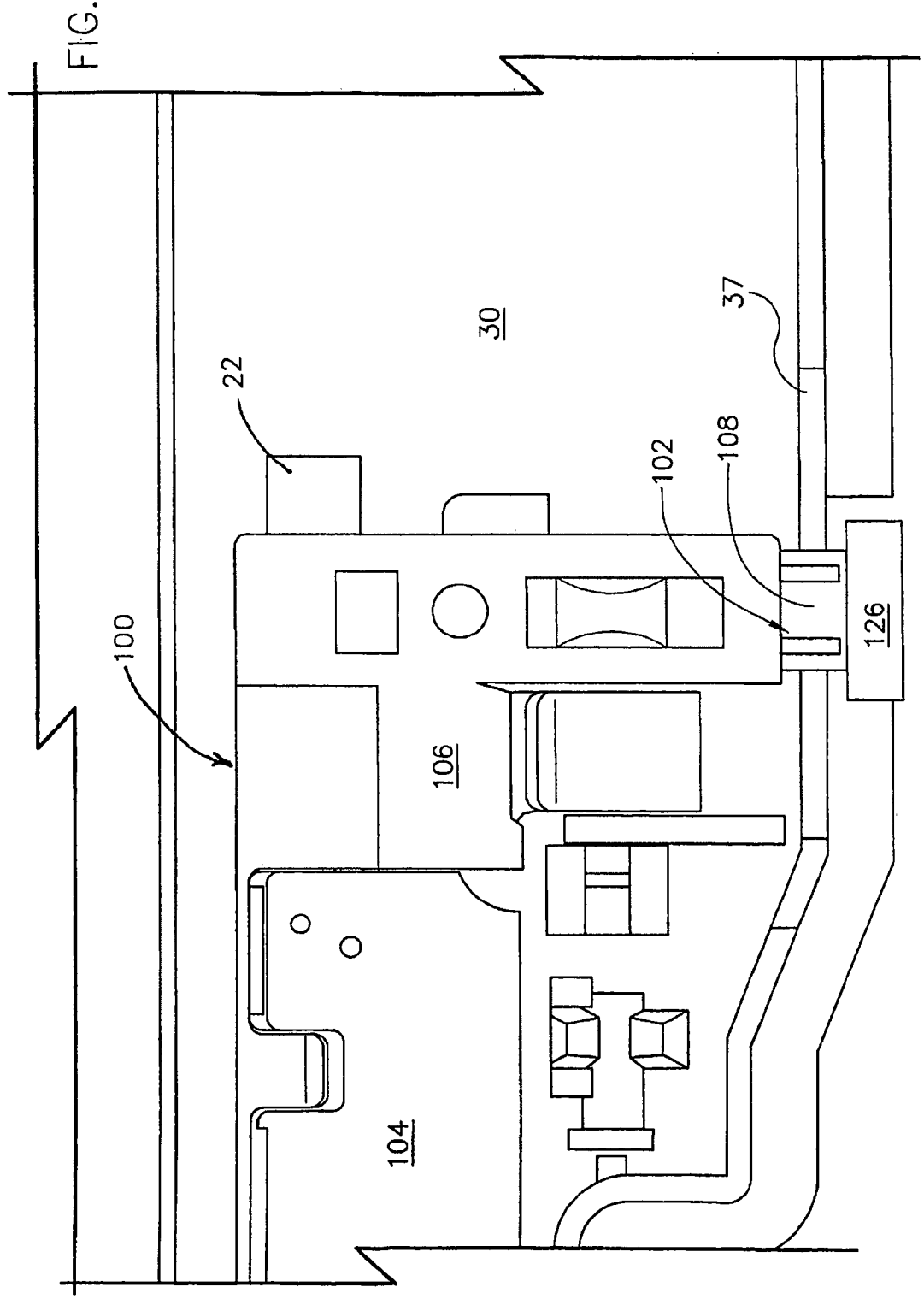
FIG. 16 is a schematic representation of a fragmentary plan view of the visor of FIG. 13.

Visor core 30 is also shown to include a retention structure 120 configured to interlock with a projection 102 extending from the fixed carrier and spring assembly 100. Retention structure 120 is formed with visor core 30 adjacent to wall 37 as a "doghouse" shown as having two side walls 122, 124 and a top wall 126. According to an alternative embodiment, the doghouse may be formed with fewer or different "walls" such as shown in FIG. 14 where side wall 124 is omitted. A resilient hook member 128 (e.g. barb, prong, etc.) extends downwardly from top wall 126 and includes a "ramped" portion 130 configured to deflect hook member 128 upwardly to permit passage of projection 102 into the doghouse and to "snap-back" into place when the projection is received in the doghouse. According to other embodiments, the resilient hook member and the projection may be reversed or reoriented. For example, the resilient hook member may extend from a bottom wall or side wall of the doghouse. Further, the resilient hook member may extend from the carrier and arranged to engage a stationary projection extending from the visor core.

Fixed carrier and spring assembly 100 includes a spring 104 mounted to a carrier base 106 that is coupled to pivot rod 22 in an axially non-extendable and non-retractable manner. Carrier base 106 includes projection 102 (shown as a generally L-shaped tab 108, but may have other shapes such as T-shaped, etc.) extending from the carrier base 106. A first leg 110 of tab 108 is configured to extend over wall 37 and to be captured within retaining structure 120 by side wall 122, hook member 128, top wall 126, and the top of wall 37 to prevent sliding of the visor core along the axis of pivot rod 22. A second leg 112 of tab 108 has a thickness sufficient to be securely captured within the retaining structure by side wall 124 and a side 37A of wall 37 to minimize any movement of the fixed carrier and spring assembly 100 relative to visor core 30 and is intended to provide a "tight" connection that minimizes squeaks or rattling. According to another embodiment, a contact member (not shown) may be provided on the opposite core half of the visor and configured to make contact with, or compress, top wall 126 or wall 37 when the visor halves are folded together, to further secure projection 102 within retention structure 120.

During assembly of the visor for use with a fixed assembly, tab 108 is placed over wall 37 and then "slid" into the retaining structure 120 by deflecting hook member 128 upward until tab 108 is within the retaining structure and the hook member "snaps" back into place to lock the fixed elbow and spring assembly to the core.

According to any preferred embodiment, the visor core is configured to be a relatively "standardized" design capable of use with both a sliding assembly (as described in reference to FIGS. 5-12 and with a fixed assembly (as described in reference to FIGS. 13-16).

Figure 17:
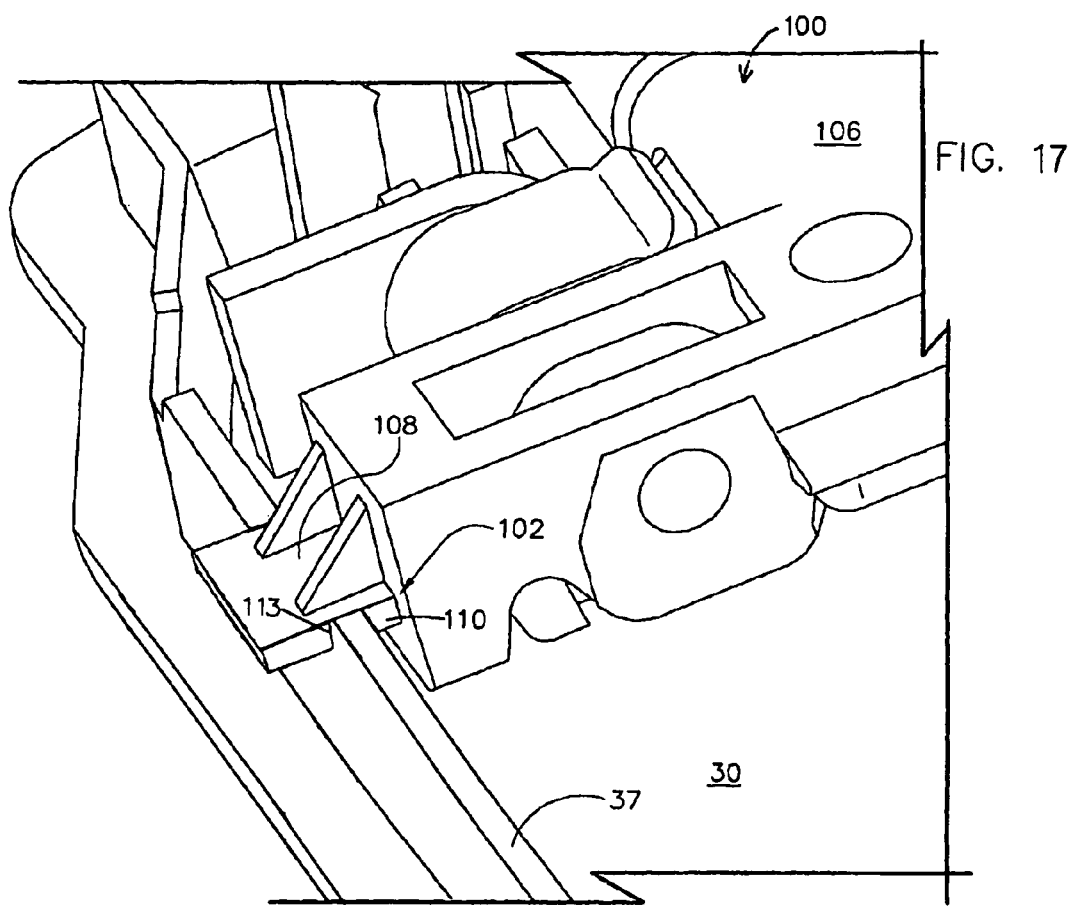
FIG. 17 is a schematic representation of a fragmentary plan view of the visor according to another embodiment of the present invention.
Figure 18:
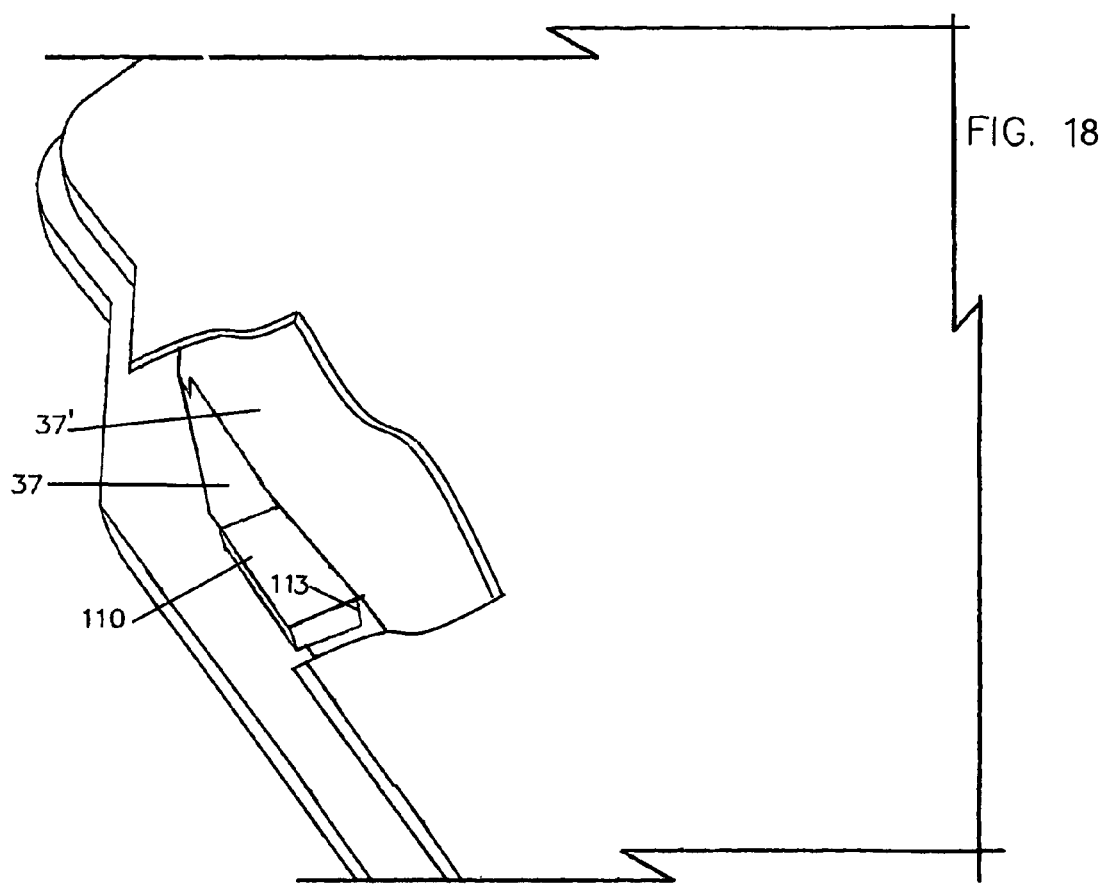
FIG. 18 is a schematic representation of a fragmentary plan view of the visor of FIG. 17 with the core halves joined.

According to an alternative embodiment in which the channel 36 of the visor core is configured to receive a visor slide mechanism having a fixed tube (such as with a reciprocally slidable carrier assembly and pivot rod received therein), a retention structure (e.g. "doghouse," posts, dividers, panels, etc.) may be provided at any desirable location adjacent to the channel and configured to receive any suitable projection extending from the fixed carrier and spring assembly (or directly engagable with the outer structure of the fixed carrier and spring assembly itself) for use in non-sliding visor applications. Accordingly, the core structure of the visor body may have any shape or configuration suitable for use in either a sliding visor application and a non-sliding visor application, and the projection on (or housing of) the non-sliding mechanism may be provided in any shape to engage the channel structure of the visor core for use in non-sliding visor applications. For example, as shown in FIG. 17, the projection extending from the non-sliding mechanism may be a tab or tang configured to be "locked" within a recess when the two halves of the core are joined together. In this case, the recess may be a notch, slot, gap, opening, etc. (such as for example a notch 113 in wall 37 that may engage a tab similar to first leg 110 without a second leg such as leg 112, where the width of notch 113 would correspond to a width of leg 110 and would be captured between walls 37 and 37' upon joining the core halves as shown in FIG. 18). The recess may also be defined by walls or ribs, etc. and arranged to engage the projection to prevent axial movement of the non-sliding mechanism.

It is important to note that the construction and arrangement of the elements of the various embodiments of the visor provided herein is illustrative only. Although only a few exemplary embodiments of the present inventions have been described in detail in this disclosure, those skilled in the art who review this disclosure will readily appreciate that many modifications are possible in these embodiments (such as variations in shape, size and structure of the core configuration, variations in the interfacing structure between the carrier/spring assemblies and the visor core, and variations in the configuration and integration of the tab and dog house on the fixed carrier/spring assembly, the shape and size of the components, use of colors, combinations of shapes, etc.) without materially departing from the novel teachings and advantages of the inventions. Further, the visor may be used in any type of vehicle such as trucks, recreational vehicles, minivans, sport utility vehicles, passenger automobiles, etc. and at any suitable location within the vehicle. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A visor for a vehicle usable with a slide mechanism and a non-slide mechanism, comprising:
   a body portion having a first core half and a second core half;
   a channel formed in the body portion and configured to receive the slide mechanism for a sliding visor application and configured to receive the non-slide mechanism for a non-sliding visor application;
   a wall extending from the body portion adjacent to the channel; and
   a receptacle on one of the first core half and the second core half and configured to receive a projection extending from the non-slide mechanism to substantially prevent sliding of the non-slide mechanism with respect to the body portion,
   wherein the projection extends over the wall to engage the receptacle.

2. The visor of claim 1 wherein the wall is configured to engage the non-slide mechanism.

3. The visor of claim 1 wherein the wall extends substantially along a length of the channel.

4. The visor of claim 1 wherein the receptacle is disposed adjacent to the wall.

5. The visor of claim 4 wherein the receptacle is disposed on one side of the wall opposite the channel.

6. The visor of claim 1 wherein the receptacle comprises at least one side panel configured to restrict movement of the projection in at least one direction.

7. The visor of claim 1 wherein the receptacle comprises a resilient hook member configured to retain the projection within the receptacle.

8. A visor for a vehicle usable with a slide mechanism and a non-slide mechanism, comprising:
   a body portion having a first core half and a second core half;
   a channel formed in the body portion and configured to receive the slide mechanism for a sliding visor application and configured to receive the non-slide mechanism for a non-sliding visor application;
   a wall extending from the body portion adjacent to the channel; and
   a receptacle on one of the first core half and the second core half and configured to receive a projection extending from the non-slide mechanism to substantially prevent sliding of the non-slide mechanism with respect to the body portion,
   wherein the projection extends through the wall to engage the receptacle.

9. The visor of claim 1 wherein the projection comprises an L shape.

10. The visor of claim 1 wherein the receptacle receives the projection in a snap-fitting manner.

11. The visor of claim 1 further comprising a rod having one end attachable to the vehicle and another end configured to be pivotally received by the slide mechanism and the non-slide mechanism.

12. The visor of claim 1 wherein a raised guide rail extending from the wall slidably engages the slide mechanism.

13. The visor of claim 1 wherein the projection comprises a member configured to engage the receptacle to substantially prevent movement of the non-slide mechanism with respect to the body portion.

14. A visor for use with a slide mechanism in a sliding visor application and a non-slide mechanism in a non-sliding visor application, comprising:
   a core portion having a channel having a size and shape configured to receive the slide mechanism to permit a slidable interaction between the core portion and a visor pivot rod in a sliding direction, the size and shape of the channel also being configured to receive the non-slide mechanism; and
   a receptacle on the core portion configured to engage the non-slide mechanism;
   wherein, when the non-slide mechanism is used in the non-sliding visor application, the non-slide mechanism is substantially fixed to the core portion to prevent movement therealong,
   wherein the receptacle does not inhibit the slidable interaction between the core portion and the visor pivot rod in the sliding visor application in the sliding direction.

15. The visor of claim 14 wherein the receptacle comprises two side walls and a top wall formed on the core portion.

16. The visor of claim 15 wherein a resilient member extends downward from the top wall and is adapted to retain a projection on the non-slide mechanism in a snap-fitting manner.

17. The visor of claim 16 wherein the receptacle is capable of restricting movement of the projection in at least two directions.

18. The visor of claim 14 wherein the receptacle is an opening formed on a wall section of the core portion.

19. The visor of claim 18 wherein the non-slide mechanism comprises a projection extendable through the opening.

20. The visor of claim 19 wherein the projection comprises a tab that is captured between opposing halves of the core portion.

21. A method of making a visor for use in a sliding visor application and a non-sliding visor application, comprising:
   providing a first visor pivot mechanism for use in the sliding visor application and a second visor pivot mechanism for use in the non-sliding visor application and rotatably adjustable about a visor pivot rod;
   providing a core portion having a channel adjacent to a top edge of the core portion, the channel having a size and shape configured to interchangeably receive the first visor pivot mechanism and the second visor pivot mechanism;
   providing a receptacle on the core portion to engage a projection on the second visor pivot mechanism; and
   installing one of the first visor pivot mechanism and the second visor pivot mechanism into the channel such that when the first visor pivot mechanism is installed, the core portion is slidable relative to the visor pivot rod in a slidable interaction and such that when the second visor pivot mechanism is installed, the receptacle engages the projection and the core portion is not slidable relative to the visor pivot rod,
   wherein the receptacle does not inhibit the slidable interaction between the core portion and the visor pivot rod in the sliding visor application in a sliding direction.

22. The method of claim 21 wherein the receptacle comprises an enclosure formed on the core portion external to the channel and configured to receive at least a portion of the projection extending from the second visor pivot mechanism.

23. The method of claim 21 wherein the receptacle comprises an opening formed on a wall member adjacent to the channel on a first half of the core portion that is configured to receive and retain the projection when a second half of the core portion is joined to the first half to prevent axial sliding of the non-slide mechanism.

24. A visor for use with a slide mechanism in a sliding visor application and a non-slide mechanism in a non-sliding visor application, comprising:
   a core portion having a channel having a size and shape configured to receive the slide mechanism to permit a slidable interaction between the core portion and a visor pivot rod, the size and shape of the channel also being configured to receive the non-slide mechanism; and
   a receptacle on the core portion configured to engage the non-slide mechanism;

wherein, when the non-slide mechanism is used in the non-sliding visor application, the non-slide mechanism is substantially fixed to the core portion to prevent movement therealong, wherein the receptacle is an opening formed on a wall section of the core portion, wherein the non-slide mechanism comprises a projection extendable through the opening, and wherein the projection comprises a tab that is captured between opposing halves of the core portion.

* * * * *